Oct. 19, 1926.
F. S. KOCHENDORFER ET AL
1,603,778
STRAND OR CORD WORKING MECHANISM
Original Filed July 31, 1920   2 Sheets-Sheet 1
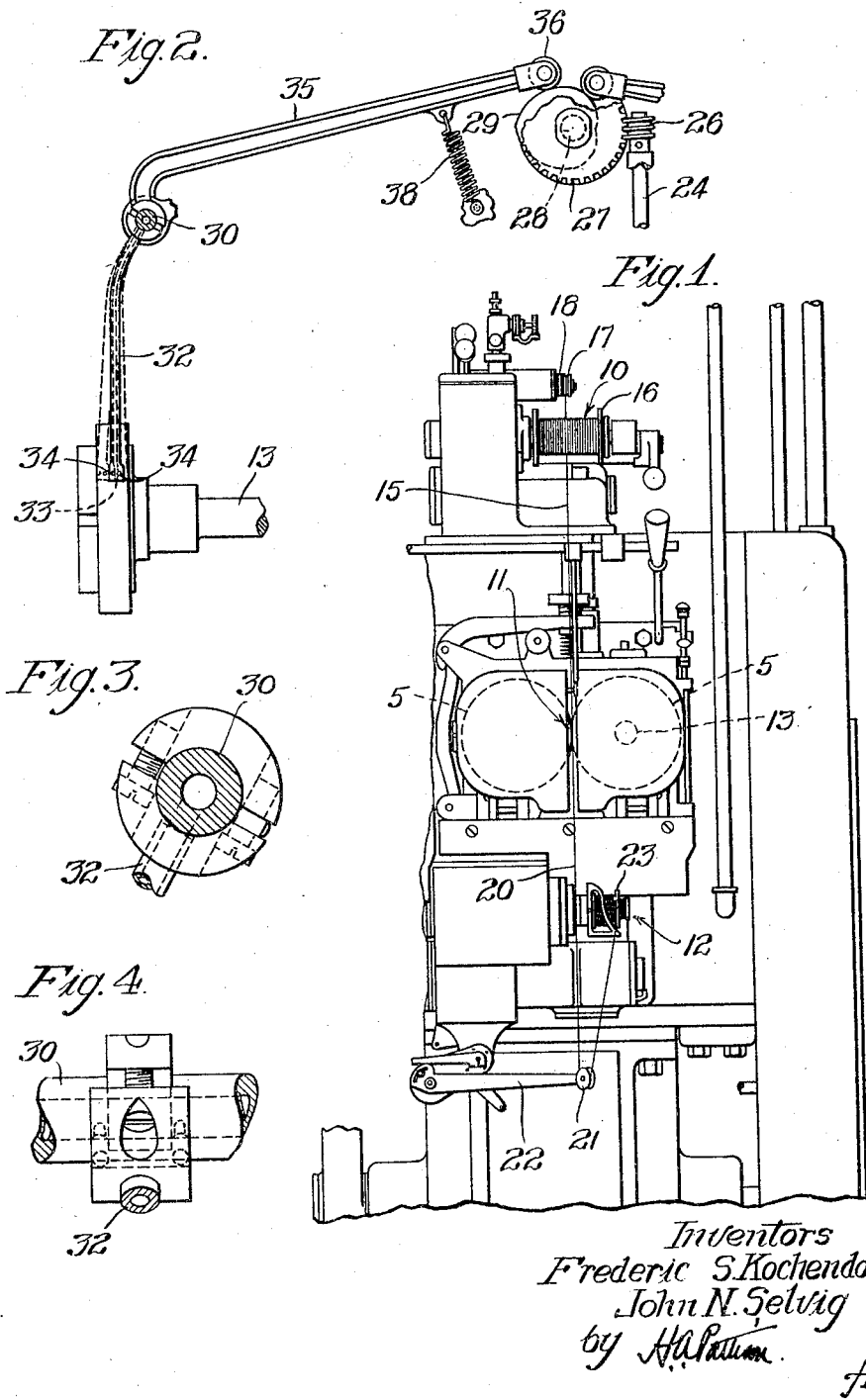
Inventors
Frederic S. Kochendorfer
John N. Selvig
by H.A. Patten
Atty.

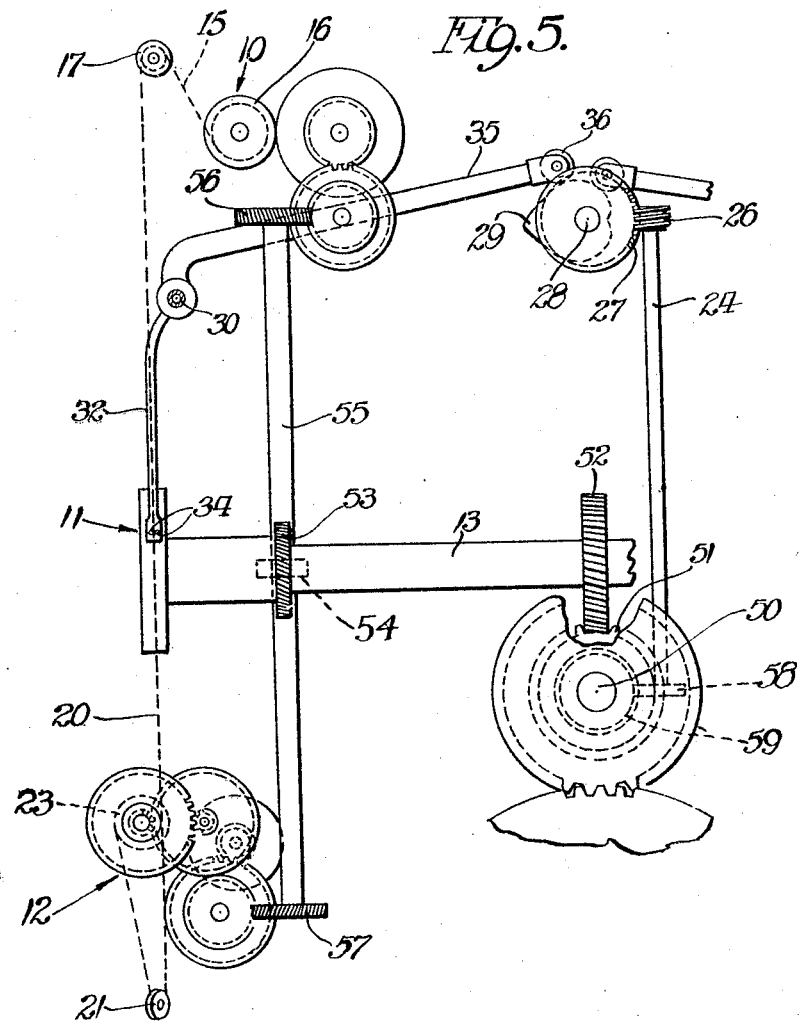

Patented Oct. 19, 1926.

1,603,778

UNITED STATES PATENT OFFICE.

FREDERIC S. KOCHENDORFER, OF RIVER FOREST, AND JOHN N. SELVIG, OF CHICAGO, ILLINOIS, ASSIGNORS TO WESTERN ELECTRIC COMPANY, INCORPORATED, OF NEW YORK, N. Y., A CORPORATION OF NEW YORK.

STRAND OR CORD WORKING MECHANISM.

Original application filed July 31, 1920, Serial No. 400,301. Divided and this application filed March 6, 1923. Serial No. 623,204.

This invention relates to a cord or strand working mechanism which has for its principal object the provision of a mechanism by means of which flat tinsel strands of small cross-sectional area and of uniform size may be rapidly and economically produced, and more particularly to such a mechanism employing rolls for producing the tinsel strands.

The primary object of the present invention is to evenly distribute the wear on the tinsel rollers and to cool and clean the rollers during their operation. To this end a mechanism is provided for causing the wire, which is flattened by the rollers to form flat tinsel strands, to traverse the surfaces of the rollers to prevent grooving on their faces and thereby evenly distribute wear thereon. Means are also provided for supplying a cooling medium, preferably air under pressure, to the faces of the rollers for cooling and cleaning them during their operation.

This application is a division of application Serial No. 400,301, filed July 31, 1920, now Patent 1,520,718, issued December 30, 1924, which discloses a strand or cord working mechanism to which the invention disclosed herein is particularly adapted.

In the drawings illustrating this invention:

Fig. 1 is a fragmentary front view of a tinsel rolling machine showing one unit of a machine embodying the features of the invention;

Fig. 2 is a detail view of the mechanism for causing the wire to traverse the faces of the rollers and for supplying air under pressure thereto;

Fig. 3 is an enlarged detail view showing the means for clamping the distributing pipe onto the air supply tube, and Fig. 4 is a front view of Fig. 3, and Fig. 5 is a diagrammatic view of the driving mechanism for the supply and take-up spools, rollers, and a mechanism for causing the wire to traverse the faces of the rollers.

As shown in the drawings, with the exception of Fig. 1, the machine frame has been omitted except as a mounting means for parts concerned in this invention. In its preferred form the machine is provided with a number of independent rolling units, half of which are mounted on each side of the machine frame.

Each complete rolling unit comprises three sub-units—a supply spool unit 10, a rolling unit 11, and a take-up spool unit 12. These sub-units are mounted independently of each other in such a way that any one of them can be removed without disturbing the others. As best shown in Fig. 5, each complete unit is driven from a common drive shaft 50 running the length of the machine and driven from a motor through suitable intermediate gearing. Mounted on the shaft 50 at spaced intervals are gears such as 51, one for each complete unit, each of which meshes with a gear 52 mounted on a shaft 13 which drives the roller sub-unit 11. Mounted on the shaft 13 intermediate its ends is a gear 53 which meshes with a gear 54 to drive a vertical shaft 55 which at its ends carries gears 56 and 57 for driving the supply and take-up spool units 10 and 12 respectively.

The wire 15 is fed from the under side of a power driven supply spool 16 to a roller 17 on the end of a tension lever arm 18 located above the spool 16. After passing over the roller 17, the wire passes down between the rollers 5 of the rolling unit 11 and is rolled into tinsel at a constant speed. The tinsel 20 then passes down and under a roller 21 on the end of a second tension lever arm 22 to a take-up spool 23.

For a complete disclosure of the mechanism for driving the rolls, supply and take-up spools, together with the tension mechanism for controlling the speed of the supply and take-up spools, reference is made to our co-pending application above referred to.

The mechanism for causing the wire to traverse the surface of the rollers to more evenly distribute the wear thereon and for supplying air under pressure to the faces of the rollers to cool and clean them is illustrated in Fig. 2. This mechanism comprises a vertically disposed shaft 24 carrying on its lower end a gear 58 meshing with a gear 59 fastened upon the main drive shaft 50, the said shaft 24 carrying at its upper end a worm 26 which drives a worm gear 27. The worm gear 27 is fixed to a shaft 28 on which is fixed a heart-shaped cam 29. Mounted above the rolling units and running the full length of the machine is a rotatable air tube 30 having distributing pipes 32 leading therefrom and down to a point above the center and between each pair of rollers. The end of the distributing pipe is flattened except in the center where a small opening 33 is left for the escape of air under pressure onto the faces of the rollers which cools and cleans them. On the flattened end of the distributing pipe 32 and on each side of the air outlet 33 is fixed a pin 34. The wire 15 is threaded between these pins 34. Fastened to the air tube 30 is a roller arm 35 which carries at one end a roller 36 which engages the face of the cam 29. A spring 38 fastened to the arm 35 keeps the roller 36 in engagement with the face of the cam 29. The movement of the cam 29 gives to the distributing pipe 32 a slow oscillating motion which serves to guide the wire as it is being rolled back and forth over the face of the rollers, thereby evenly distributing the wear and preventing grooves thereon.

What is claimed is:

1. In a rolling machine, a pair of flattening rollers, means for feeding a strand between said rollers, and means for moving the strand across the faces of the rollers to cause said faces to wear evenly.

2. In a rolling machine, a pair of flattening rollers, means for feeding a strand between said rollers, and means for moving the strand back and forth across the faces of the rollers to cause said faces to wear evenly.

3. In a rolling machine, a pair of flattening rollers, means for feeding a strand between said rollers, a reciprocating guide arm and a guide upon one end of said arm to move said strand back and forth across the surfaces of said rollers.

4. In a rolling mechanism, a pair of flattening rollers, and reciprocating means for feeding fluid across the faces of said rollers to clean and cool said rollers.

5. In a rolling mechanism, a pair of flattening rollers, an air pipe adapted to discharge air across the faces of said rollers, and means for reciprocating said air pipe.

6. In a rolling machine, a pair of flattening rollers, means for feeding a strand between said rollers, and unitary means for moving said strand across the faces of said rollers and discharging air across the faces of said rollers.

7. In a rolling machine, a pair of flattening rollers, means for feeding a strand between said rollers, means for advancing said strand across the faces of said rollers and means for discharging air across the faces of said rollers.

8. In a rolling mechanism, a pair of flattening rollers, an air discharge pipe opening adjacent the faces of said rollers, means for reciprocating the open end of said pipe back and forth across the faces of said rollers, means for feeding a strand between said rollers, and guiding means carried by said pipe to reciprocate the strand back and forth across the faces of said rollers.

In witness whereof, we hereunto subscribe our names this 23rd day of February A. D., 1923.

FREDERIC S. KOCHENDORFER.
JOHN N. SELVIG.